United States Patent
Subramanian et al.

(10) Patent No.: US 10,219,270 B2
(45) Date of Patent: Feb. 26, 2019

(54) ENABLING OPERATION OF VARIABLE BANDWIDTH USERS IN MILLIMETER-WAVE SYSTEMS

(71) Applicant: QUALCOMM Incorporated, San Diego, CA (US)

(72) Inventors: Sundar Subramanian, Bridgewater, NJ (US); Junyi Li, Chester, NJ (US); Ashwin Sampath, Skillman, NJ (US); Muhammad Nazmul Islam, Edison, NJ (US); Juergen Cezanne, Ocean Township, NJ (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 15/176,484

(22) Filed: Jun. 8, 2016

(65) Prior Publication Data

US 2017/0070991 A1 Mar. 9, 2017

Related U.S. Application Data (60) Provisional application No. 62/214,311, filed on Sep. 4, 2015.

(51) Int. Cl.
*H04W 72/04* (2009.01)
*H04W 16/28* (2009.01)
(Continued)

(52) U.S. Cl.
CPC ....... *H04W 72/0446* (2013.01); *H04L 5/0023* (2013.01); *H04L 5/0048* (2013.01);
(Continued)

(58) Field of Classification Search
CPC ........ H04L 5/00; H04W 16/28; H04W 56/00; H04W 56/0015; H04W 72/0446; H04W 72/0453; H04W 72/085
See application file for complete search history.

(56) References Cited

U.S. PATENT DOCUMENTS

| 9,178,679 B2 | 11/2015 | Chun et al. | |
| 2010/0159845 A1* | 6/2010 | Kaaja | H04B 7/088 455/70 |

(Continued)

FOREIGN PATENT DOCUMENTS

| EP | 1906689 A1 | 4/2008 |
| WO | WO-2010054252 A1 | 5/2010 |

(Continued)

OTHER PUBLICATIONS

International Search Report and Written Opinion—PCT/US2016/048550—ISA/EPO—dated Nov. 4, 2016.

*Primary Examiner* — Khaled M Kassim
(74) *Attorney, Agent, or Firm* — Patterson & Sheridan, L.L.P (57) ABSTRACT

Aspects of the present disclosure provided techniques for wireless communications by a base station. An exemplary method generally includes transmitting, on a narrowband region within a wider system bandwidth, a directional primary synchronization signal (DPSS), receiving feedback information from one or more user equipments (UEs) based on the DPSS, wherein the feedback information comprises an indication of a bandwidth capability of a UE that transmitted the feedback information, and allocating resources to the one or more UEs within at least one of the wider system bandwidth or the narrowband region based, at least in part, on the feedback information.

23 Claims, 7 Drawing Sheets

(51) Int. Cl.
  *H04W 56/00*   (2009.01)
  *H04W 72/08*   (2009.01)
  *H04L 5/00*    (2006.01)
  *H04L 5/16*    (2006.01)

(52) U.S. Cl.
  CPC ........... *H04L 5/0064* (2013.01); *H04W 16/28* (2013.01); *H04W 56/0015* (2013.01); *H04W 72/0453* (2013.01); *H04W 72/085* (2013.01); *H04L 5/16* (2013.01); *H04W 56/00* (2013.01)

(56) References Cited

U.S. PATENT DOCUMENTS

| | | | |
|---|---|---|---|
| 2012/0026987 A1* | 2/2012 | Jain | H04W 74/0866 370/336 |
| 2013/0089067 A1* | 4/2013 | Ji | H04W 56/00 370/330 |
| 2013/0322363 A1* | 12/2013 | Chen | H04W 72/042 370/329 |
| 2014/0011506 A1* | 1/2014 | McNamara | H04L 5/0039 455/450 |
| 2014/0036821 A1* | 2/2014 | Mcnamara | H04L 5/0007 370/329 |
| 2015/0223088 A1* | 8/2015 | Niu | H04W 24/08 370/252 |
| 2015/0230263 A1* | 8/2015 | Roy | H04W 36/0083 455/452.2 |
| 2016/0242161 A1* | 8/2016 | Webb | H04L 1/0038 |
| 2016/0338091 A1* | 11/2016 | Martin | H04L 5/003 |
| 2017/0005715 A1* | 1/2017 | Cezanne | H04B 7/0667 |
| 2017/0195998 A1* | 7/2017 | Zhang | H04W 72/042 |
| 2017/0311355 A1* | 10/2017 | Yi | H04W 74/0833 |

FOREIGN PATENT DOCUMENTS

| | | |
|---|---|---|
| WO | WO-2014036150 A1 | 3/2014 |
| WO | WO-2015157565 A1 | 10/2015 |

* cited by examiner

ENABLING OPERATION OF VARIABLE BANDWIDTH USERS IN MILLIMETER-WAVE SYSTEMS

CLAIM OF PRIORITY UNDER 35 U.S.C. § 119

This application claims benefit of U.S. Provisional Patent Application Ser. No. 62/214,311, filed Sep. 4, 2015, which is herein incorporated by reference in its entirety.

BACKGROUND

I. Field

Certain aspects of the present disclosure generally relate to wireless communications and, more particularly, to enabling operation of variable bandwidth users in millimeter-wave (MMW) systems.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

Certain aspects of the present disclosure provide a method for wireless communications by base station. The method generally includes transmitting, on a narrowband region within a wider system bandwidth, a directional primary synchronization signal (DPSS), receiving feedback information from one or more user equipments (UEs) based on the DPSS, wherein the feedback information comprises an indication of a bandwidth capability of a UE that transmitted the feedback information, and allocating resources to the one or more UEs within at least one of the wider system bandwidth or the narrowband region based, at least in part, on the feedback information.

Certain aspects of the present disclosure provide an apparatus for wireless communications by base station. The apparatus generally includes at least one processor configured to transmit, on a narrowband region within a wider system bandwidth, a directional primary synchronization signal (DPSS), receive feedback information from one or more user equipments (UEs) based on the DPSS, wherein the feedback information comprises an indication of a bandwidth capability of a UE that transmitted the feedback information, and allocate resources to the one or more UEs within at least one of the wider system bandwidth or the narrowband region based, at least in part, on the feedback information. The apparatus also generally includes a memory coupled with the at least one processor.

Certain aspects of the present disclosure provide an apparatus for wireless communications by base station. The apparatus generally includes means for transmitting, on a narrowband region within a wider system bandwidth, a directional primary synchronization signal (DPSS), means for receiving feedback information from one or more user equipments (UEs) based on the DPSS, wherein the feedback information comprises an indication of a bandwidth capability of a UE that transmitted the feedback information, and means for allocating resources to the one or more UEs within at least one of the wider system bandwidth or the narrowband region based, at least in part, on the feedback information.

Certain aspects of the present disclosure provide a non-transitory computer readable medium for wireless communications by base station. The non-transitory computer readable medium generally includes instructions for transmitting, on a narrowband region within a wider system bandwidth, a directional primary synchronization signal (DPSS), receiving feedback information from one or more user equipments (UEs) based on the DPSS, wherein the feedback information comprises an indication of a bandwidth capability of a UE that transmitted the feedback information, and allocating resources to the one or more UEs within at least one of the wider system bandwidth or the narrowband region based, at least in part, on the feedback information.

Certain aspects of the present disclosure provide a method for wireless communications by a user equipment (UE). The method generally includes detecting a directional primary synchronization signal (DPSS) transmitted from a base station on a narrowband region of a wider system bandwidth, transmitting feedback information, generated based on the DPSS, to the base station, wherein the feedback information comprises an indication of a bandwidth capability of the UE, and communicating with the base station using resources allocated within at least one of the wider system bandwidth or the narrowband region, based on the feedback information.

Certain aspects of the present disclosure provide an apparatus for wireless communications by a user equipment (UE). The apparatus generally includes at least one processor configured to detect a directional primary synchronization signal (DPSS) transmitted from a base station on a narrowband region of a wider system bandwidth, transmit feedback information, generated based on the DPSS, to the base station, wherein the feedback information comprises an indication of a bandwidth capability of the UE, and communicate with the base station using resources allocated within at least one of the wider system bandwidth or the narrowband region, based on the feedback information. The apparatus also generally includes a memory coupled with the at least one processor.

Certain aspects of the present disclosure provide an apparatus for wireless communications by a user equipment (UE). The apparatus generally includes means for detecting a directional primary synchronization signal (DPSS) transmitted from a base station on a narrowband region of a wider system bandwidth, means for transmitting feedback information, generated based on the DPSS, to the base station, wherein the feedback information comprises an indication of a bandwidth capability of the UE, and means for communicating with the base station using resources allocated within at least one of the wider system bandwidth or the narrowband region, based on the feedback information.

Certain aspects of the present disclosure provide a non-transitory computer readable medium for wireless communications by a user equipment (UE). The non-transitory computer readable medium generally includes instructions for detecting a directional primary synchronization signal (DPSS) transmitted from a base station on a narrowband region of a wider system bandwidth, transmitting feedback information, generated based on the DPSS, to the base station, wherein the feedback information comprises an indication of a bandwidth capability of the UE, and communicating with the base station using resources allocated within at least one of the wider system bandwidth or the narrowband region, based on the feedback information.

Numerous other aspects are provided including methods, apparatus, systems, computer program products, and processing systems.

DETAILED DESCRIPTION

Millimeter-wave (MMW) base stations may concurrently schedule a variety of UEs, for example, UEs capable of operating on varying bandwidths. There exists a need for these varying types of UEs to simultaneously discover and access the system through common discovery signals. Thus, aspects of the present disclosure provide techniques for enabling operation of variable bandwidth users in MMW systems.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
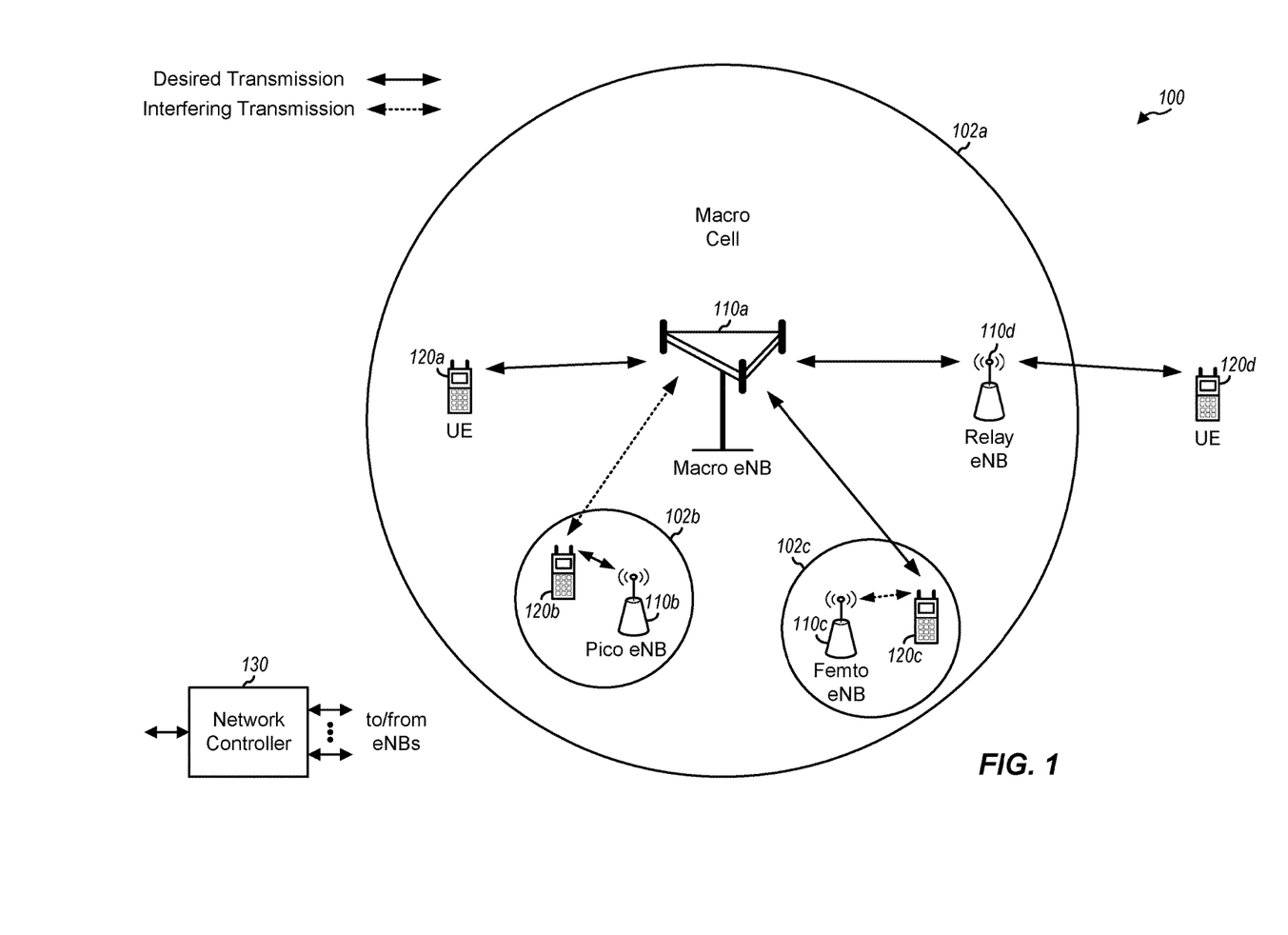
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help UEs and BSs shown in FIG. 1 communicate on a machine type physical downlink control channel (mPDCCH) using a narrowband (e.g., six-PRB) based search space.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

According to certain aspects, narrowband UEs may be limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 15 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
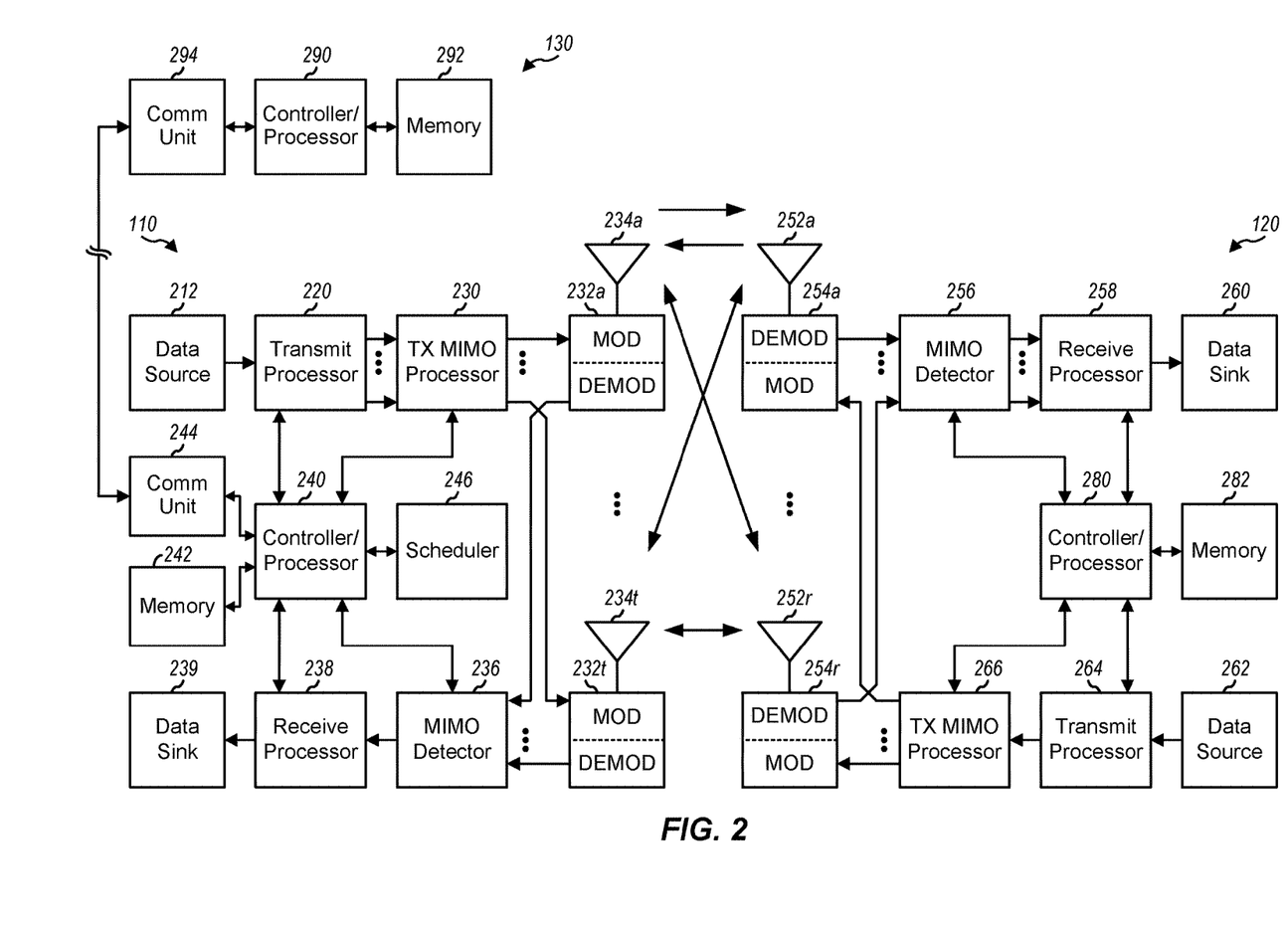
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 280 and/or other processors and modules at UE 120, may perform or direct operations 600 shown in FIG. 6. Memories 242 and 282 may store data and program codes for base station 110 and UE 120, respectively. A scheduler 246 may schedule UEs for data transmission on the downlink and/or uplink.

Figure 3:
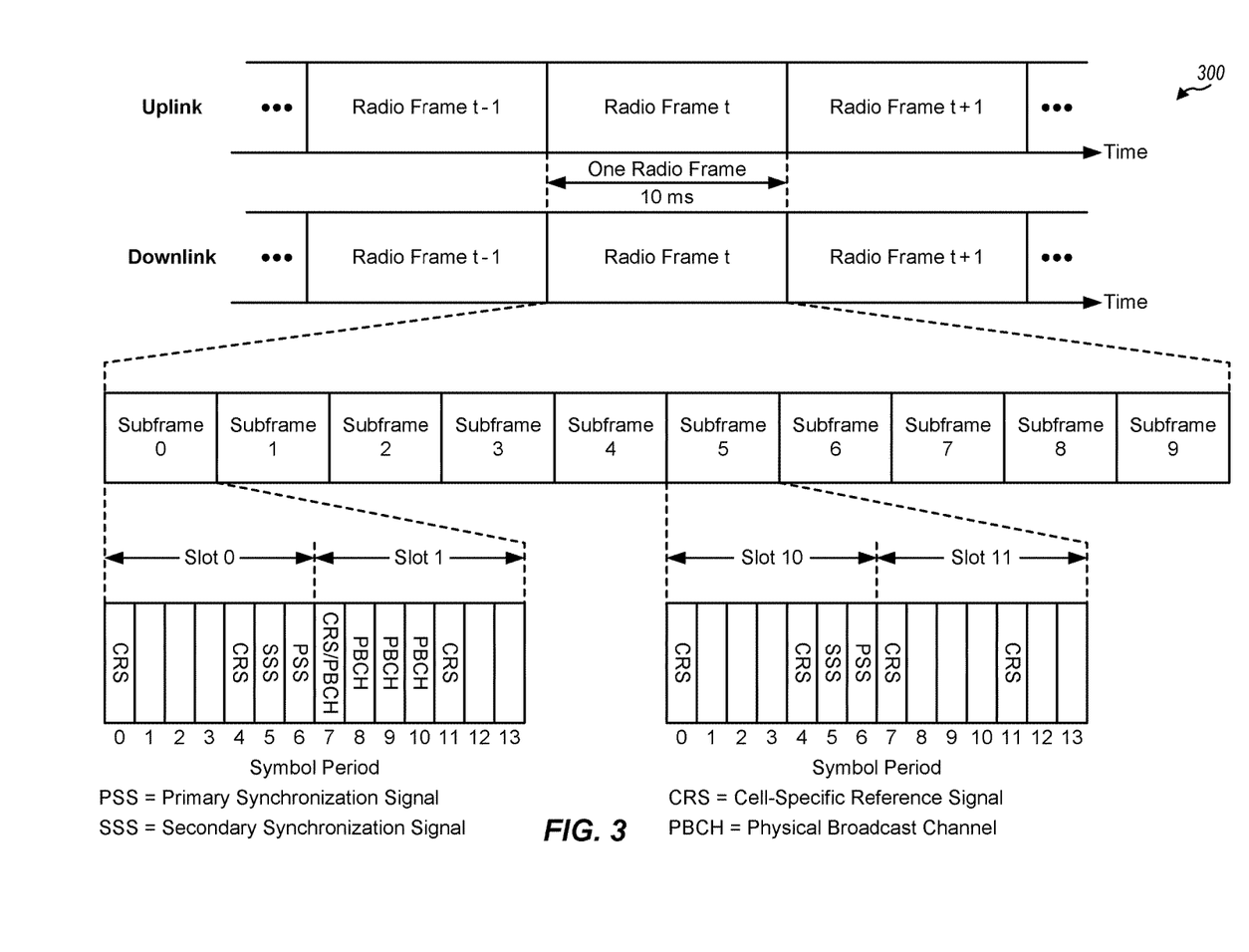
FIG. 3 shows an exemplary frame structure for FDD in LTE.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition and may contain, among other information, the cell ID along with an indication of the duplexing mode. The indication of the duplexing mode may indicate whether the cell utilizes a time division duplexing (TDD) or frequency division duplexing (FDD) frame structure. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Channel quality measurements may be performed by a UE according to a defined schedule, such one based on the DRX cycle of the UE. For example, a UE may attempt to perform measurements for a serving cell at every DRX cycle. The UE may also attempt to perform measurements for non-serving neighboring cells. Measurements for non-serving neighbor cells may be made based on a different schedule than for serving cells and the UE may need to tune away from the serving cell to measure non-serving cells when the UE is in connected mode.

To facilitate channel quality measurements, n eNB may transmit a cell specific reference signal (CRS) on specific subframes. For example, a eNB may transmit CRS over subframes 0 and 5 for a given frame. A narrowband UE may receive this signal and measure the average power of the received signal, or RSRP. The narrowband UE may also calculate a Receive Signal Strength Indicator (RSSI) based on the total received signal power from all sources. A RSRQ may be also be calculated based on the RSRP and RSSI.

To facilitate measurements, an eNB may provide a measurement configuration to UEs in its coverage area. The measurement configuration may define event triggers for measurement reporting and each event trigger may have associated parameters. When the UE detects a configured measurement event, it may respond by sending a measurement report to the eNB with information about the associated measurement objects. A configured measurement event may be, for example, a measured reference signal received power (RSRP) or a measured reference signal received quality (RSRQ) satisfying a threshold. A time-to-trigger (TTT) parameter can be used to define how long a measurement event must persist before the UE sends its measurement report. In this way, the UE can signal changes in its radio conditions to the network.

Figure 4:
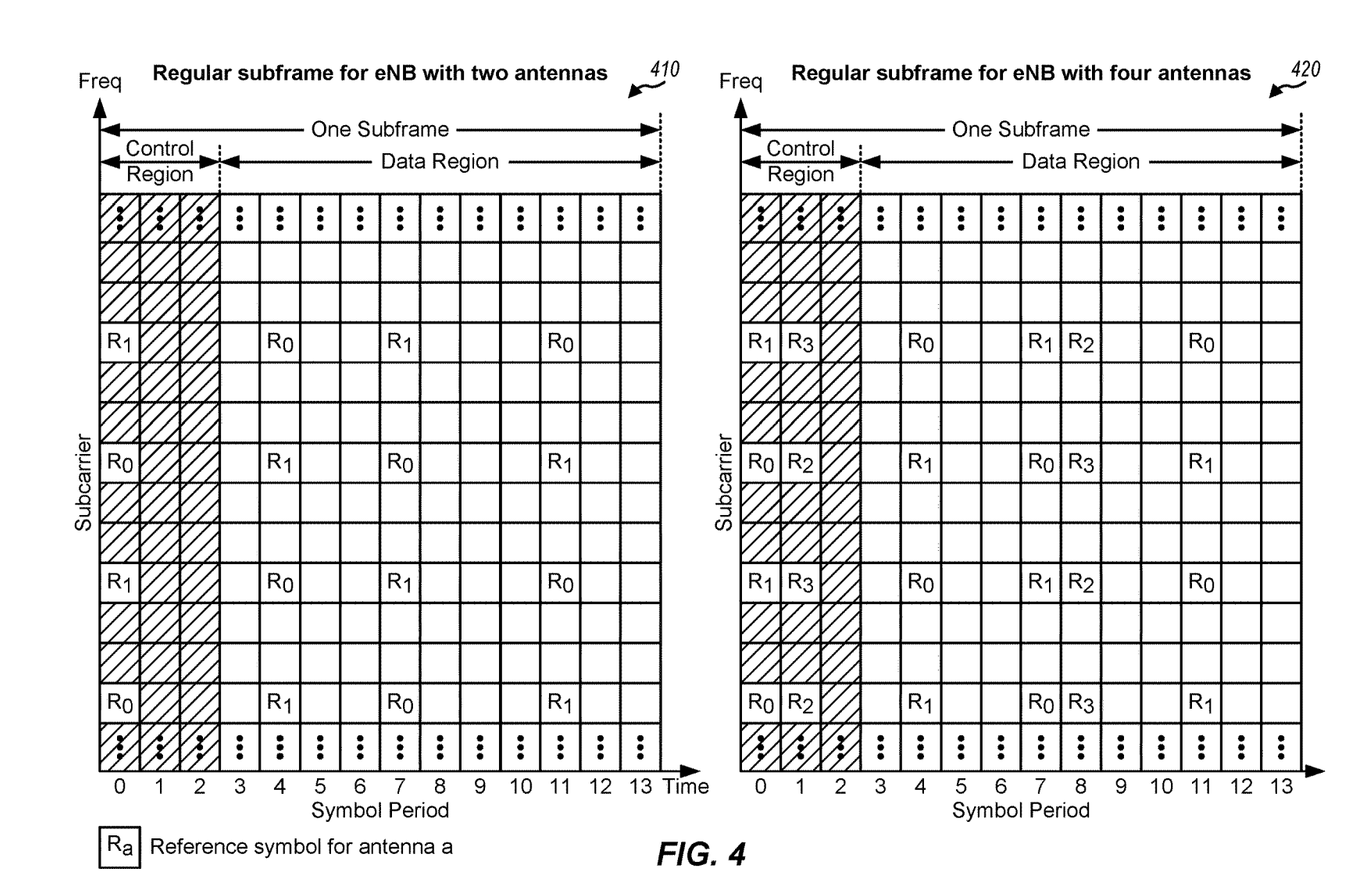
FIG. 4 shows two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

The focus of traditional LTE design is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

Thus, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, narrowband UEs may have a relaxed switching time to transition from transmitting to receiving (or receiving to transmitting). For example, the switching time may be relaxed from 20 μs for regular UEs to 1 ms for narrowband UEs. Release 12 narrowband UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

In some systems, for example, in LTE Rel-13, the narrowband may be limited to a particular narrowband assignment (e.g., of no more than six resource blocks (RBs)) within the available system bandwidth. However, the narrowband may be able to re-tune (e.g., operate and/or camp) to different narrowband regions within the available system bandwidth of the LTE system, for example, in order to co-exist within the LTE system As another example of coexistence within the LTE system, narrowband UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the narrowband UEs may be able to receive the legacy PBCH with one or more additional repetitions of the PBCH across multiple subframes. As another example, the narrowband UEs may be able to transmit one or more repetitions of PRACH (e.g., with one or more PRACH formats supported) to an eNB in the LTE system. The PRACH may be used to identify the narrowband UE. Also, the number of repeated PRACH attempts may be configured by the eNB.

The narrowband UE may also be a link budget limited device and may operate in different modes of operation (e.g. entailing different amounts of repeated messages transmitted to the narrowband UE) based on its link budget limitation. For example, in some cases, the narrowband UE may operate in a normal coverage mode in which there is little to no repetition (i.e., the amount of repetition needed for the UE to successfully receive a message may be low or repetition may not even be needed). Alternatively, in some cases, the narrowband UE may operate in a coverage enhancement (CE) mode in which there may be high amounts of repetition. For example, for a 328 bit payload, a narrowband UE in CE mode may need 150 or more repetitions of the payload in order to successfully receive the payload.

In some cases, for example, for LTE Rel-13, the narrowband UE may have limited capabilities with respect to its reception of broadcast and unicast transmissions. For example, the maximum transport block (TB) size for a broadcast transmission received by the narrowband UE may be limited to 1000 bits. Additionally, in some cases, the narrowband UE may not be able to receive more than one unicast TB in a subframe. In some cases (e.g., for both the CE mode and normal mode described above), the narrowband UE may not be able to receive more than one broadcast TB in a subframe. Further, in some cases, the narrowband UE may not be able to receive both a unicast TB and a broadcast TB in a subframe.

Narrowband UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-narrowband UEs. For example, as compared to conventional paging messages used in LTE, narrowband UEs may able to monitor and/or receive paging messages that non-narrowband UEs may not able to monitor and/or receive. Similarly, as compared to conventional random access response (RAR) messages used in a conventional random access procedure, narrowband UEs may be able to receive RAR messages that also may not be able to be received by non-narrowband UEs. The new paging and RAR messages associated with narrowband UEs may also be repeated one or more times (e.g., "bundled"). In addition, different numbers of repetitions (e.g., different bundling sizes) for the new messages may be supported.

According to certain aspects, multiple narrowband regions, with each narrowband region spanning a bandwidth that is no greater than a total of 6 RBs, may be supported by narrowband UE and/or narrowband operation. In some cases, each narrowband UE in narrowband operation may operate within one narrowband region (e.g., at 1.4 MHz or 6 RBs) at a time. However, narrowband UEs in narrowband operation, at any given time, may re-tune to other narrowband regions in the wider system bandwidth. In some examples, multiple narrowband UEs may be served by the same narrowband region. In other examples, multiple narrowband UEs may be served by different narrowband regions (e.g., with each narrowband region spanning 6 RBs). In yet other examples, different combinations of narrowband UEs may be served by one or more same narrowband regions and/or one or more different narrowband regions.

Some systems, for example, in LTE Rel-13, introduce coverage enhancements and support for narrowband UEs, as well as other UEs. As used herein, the term coverage enhancement generally refers to any type of mechanism that extends the coverage range of a device (such as an narrowband device) within a network. One approach for coverage enhancement (CE) is bundling which refers to transmitting the same data multiple times (e.g., across multiple subframes or, as will be described in greater detail below, across multiple symbols within a same subframe).

In certain systems, narrowband UEs may support narrowband operation while operating in a wider system bandwidth. For example, a narrowband UE may transmit and receive in a narrowband region of a system bandwidth. As noted above, the narrowband region may span 6 resource blocks (RBs).

Certain systems may provide narrowband UEs with coverage enhancements of up to 15 dB, which maps to 155.7 dB maximum coupling loss between the UE and an eNB. Accordingly, narrowband UEs and eNB may perform measurements at low SNRs (e.g., −15 dB to −20 dB). In some systems, coverage enhancements may include channel bundling, wherein messages associated with narrowband UEs may be repeated (e.g., bundled) one or more times.

Certain devices may be able to communicate both with legacy type communications and non-legacy type communications. For example, some devices may be able to communicating in both narrowband regions (of overall system bandwidth) as well as wider band regions. While the examples above refer to low cost or MTC devices that communicate via narrowband regions, other (non low cost/non-MTC) types of devices may also communicate vie narrowband regions, for example, taking advantage of frequency selectivity and directional transmissions.

Example Operation of Variable Bandwidth Users in Millimeter-Wave System Systems

Figure 5:
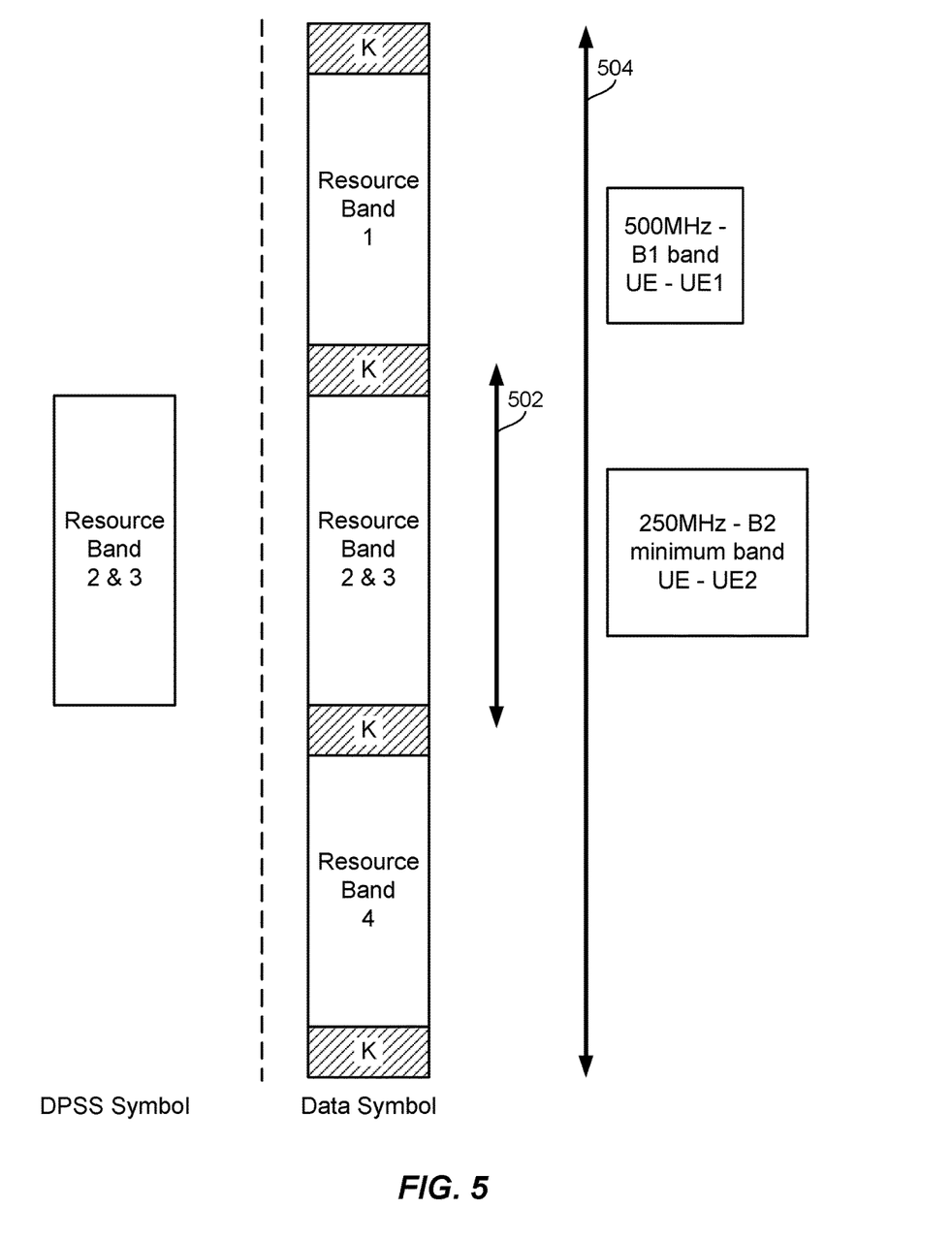
FIG. 5 illustrates an allocation of system bandwidth, in accordance with certain aspects of the present disclosure.

Certain types of base station (BSs), such as millimeter wave (MMW) BSs, may concurrently schedule UEs capable of operating at different system bandwidths (e.g., narrowband and wideband UEs). For example, as illustrated in FIG. 5, some UEs (e.g., wideband UEs), and certain BSs, may be able to process higher bandwidths (e.g., 500 MHz), while other UEs (e.g., narrowband UEs) may only be capable of supporting lower bandwidths (e.g., 250 MHz).

That is, certain wideband UEs may be capable of operating in a wider system bandwidth (e.g., wideband region 504) while narrowband UEs may only be capable of operating in narrow region of the wider system bandwidth (e.g., narrowband region 502). Additionally, some MMW BSs, operating with an integrated Access/backhaul setting, may have messages intended for other BSs as well.

Discovery signals, such as directional primary synchronization signals (DPSS), may be transmitted by a BS in order to obtain feedback information used in scheduling UEs that the BS is serving. Additionally, in some cases, these discovery signals may be beamformed and potentially used for directional search and tracking. Thus, as MMW BSs may concurrently schedule UEs capable of operating at different system bandwidths, there exists a need for all of these UEs to simultaneously discover and access the system through common discovery. In other words, there exists a need for a BS to be able to transmit common discovery signals to all UEs that it is serving, regardless of each UE's bandwidth capability.

Figure 6:
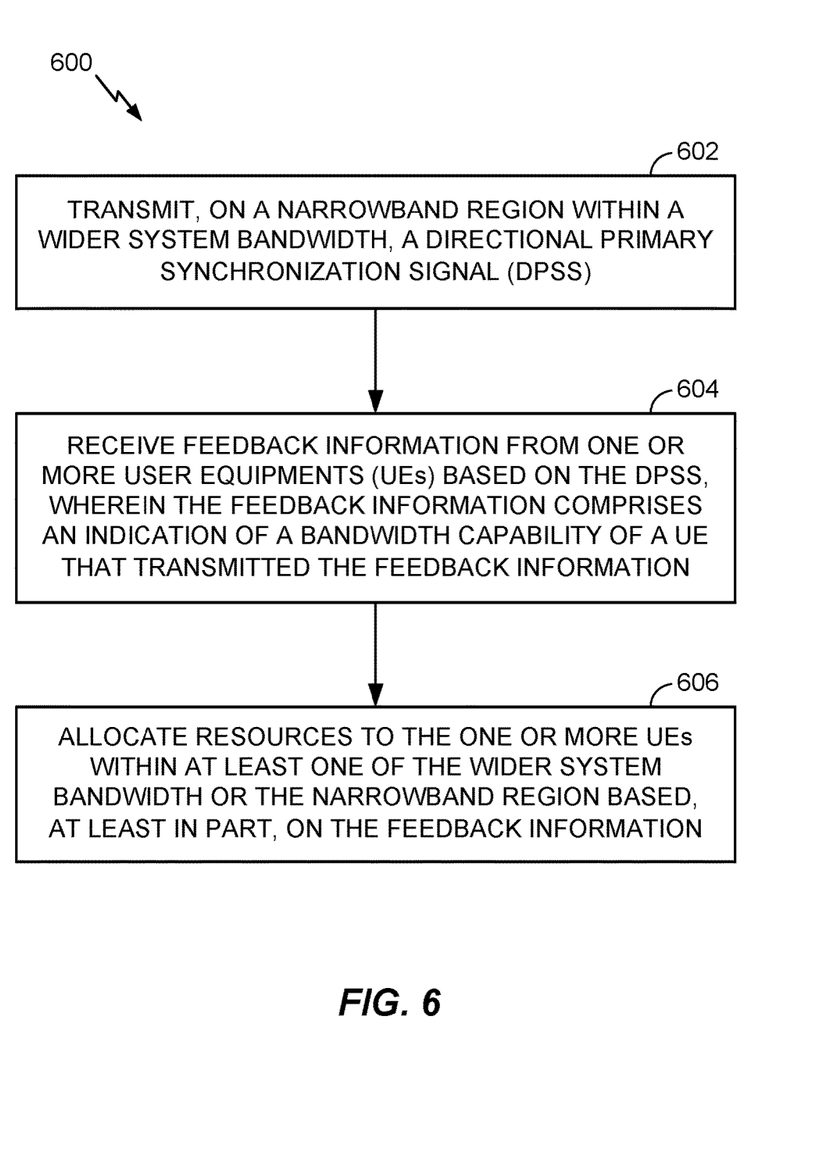
FIG. 6 illustrates example operations that may be performed by a base station, in accordance with certain aspects of the present disclosure.

FIG. 6 illustrates example operations 600 for enabling operation of variable bandwidth users in MMW systems. Operations 600, may be performed, for example, by a base station (e.g., BS 110) participating in a procedure involving DPSS transmissions, such as a DPSS beam sweep, a sub-array selection procedure, a beamformer selection procedure, random access channel beamforming, and/or beam refinement.

Operations 600 begin at 602 by transmitting, on a narrowband region within a wider system bandwidth, a directional primary synchronization signal (DPSS). At 604, the BS receives feedback information from one or more user equipments (UEs) based on the DPSS, wherein the feedback information comprises an indication of a bandwidth capability of a UE that transmitted the feedback information. At 606, the BS allocates resources to the one or more UEs within at least one of the wider system bandwidth or the narrowband region based, at least in part, on the feedback information. For example, the BS may allocate resource blocks (RBs) within the narrowband region to a first set of one or more UEs that provided feedback based on the DPSS and allocate RBs spanning the region that is wider than the narrowband region to a second set of one or more UEs.

Figure 7:
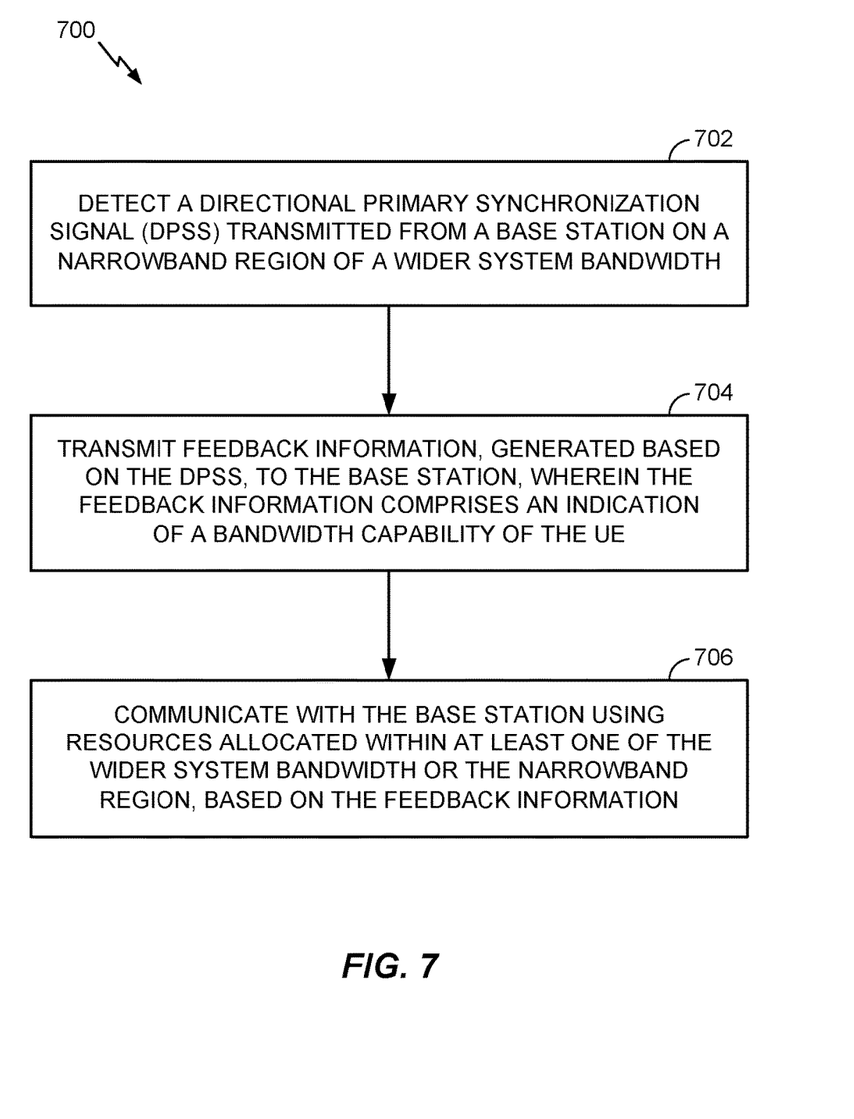
FIG. 7 illustrates example operations that may be performed by a user equipment, in accordance with certain aspects of the present disclosure.

FIG. 7 illustrates example operations 700 for enabling operation of variable bandwidth users in MMW systems. Operations 700, may be performed, for example, by a user equipment (e.g., UE 120), for example, one of the UEs participating in operations 600 described above.

Operations 700 begin at 702 by detecting a directional primary synchronization signal (DPSS) transmitted from a base station on a narrowband region of a wider system bandwidth. At 704, the UE transmits feedback information, generated based on the DPSS, to the base station, wherein the feedback information comprises an indication of a bandwidth capability of the UE. At 706, the UE communicates with the base station using resources allocated within at least one of the wider system bandwidth or the narrowband region, based on the feedback information. For example, the allocated resources may comprise at least one of resource blocks (RBs) within the narrowband region or RBs spanning the region that is wider than the narrowband region.

As noted above, a base station (e.g., a MMW BS) may transmit a directional primary synchronization signal (DPSS). As illustrated in FIG. 5, the DPSS may be transmitted in a narrowband region 502 of a wider system bandwidth (e.g., wideband region 504). For example, as illustrated, DPSS may be transmitted in narrowband region 502 (e.g., frequency resource bands 2 and 3), allowing narrowband UEs, which are capable of operating in the narrowband region 502, and wide band UEs, which are capable of operating across a wider system bandwidth (e.g., wideband region 504), to detect the same DPSS transmitted by the base station According to certain aspects, in response to receiving a DPSS, a UE may be able to determine the best beam direction between it and the base station that transmitted the DPSS. Subsequently, the UEs that received the DPSS may transmit feedback information to the base station, allowing the base station to determine which UEs are active in the cell and to schedule those active UEs.

In some cases, the feedback information may comprise an indication of the best beam direction between the UE transmitting the feedback information and the base station that transmitted the DPSS. Additionally, the feedback information may also comprise an indication of a bandwidth capability of the UE (e.g., whether the UE is capable of narrowband or wideband communication) transmitting the feedback information.

The bandwidth indication in the feedback may indicate to the base station which frequency band to schedule a particular UE. For example, if the feedback information indicates that the UE is capable of wideband operation, the base station may schedule this UE in a wideband region (e.g., wideband region 504) and if the feedback information indicates that the UE is capable of narrowband operation, the base station may schedule the UE in a narrowband region of a wider system bandwidth (e.g., narrowband region 502).

After the base station has performed beamforming and scheduled the UEs, the channels between the base station and the UEs may still be frequency selective. For example, as a result of DPSS transmitted on the narrower band (e.g., narrowband region 502), the best beam direction indicated in the feedback information, which may be best suited for a narrowband region, may not be the best suited for a wideband region (e.g., wideband region 504).

Thus, according to certain aspects, additional beam tracking may be necessary for those UEs scheduled in the wideband region 504. For example, this additional beam tracking may be based on a difference in CQI between the received power in the wideband region 504 using the best beam direction and a received power of the transmission to the UE using the best beam direction in the narrowband region 502.

According to certain aspects, if a significant difference is observed in CQI, an base station may decide to perform beam training by transmitting one or more beam tracking waveforms to the UE in the wideband region 504 using different combinations of directions and bandwidth regions, which may be different than the directions the DPSS was transmitted, to determine a new best beam direction for the UE in the wideband region. According to certain aspects, these beam tracking waveforms may be transmitted on a unicast basis to a single UE. The UE may detect the beam tracking waveforms transmitted by the base station in certain bandwidths and provide feedback (e.g., of a desired bandwidth or a measurement taken based on the tracking waveforms). Based on this feedback, the base station may determine a preferred bandwidth and/or preferred direction for communicating with that UE that's operating in the wideband region.

According to certain aspects, this additional beam tracking may be advantageous over transmitting a wideband DPSS waveform repeated in different bandwidths as transmitting a wideband DPSS is disadvantageous from a link budget perspective.

As noted above, depending on the bandwidth capability of a particular UE, the base station may schedule the UE in wideband region 504 or a narrowband region 502. According to certain aspects, resource blocks for UEs capable of wideband operation may be scheduled by a base station over the wider system bandwidth (e.g., wideband region 504), whereas resource blocks for UE capable only of narrowband operation may only be scheduled by the eNB within the narrowband region of the wider system bandwidth (e.g., narrowband region 502).

According to certain aspects, when scheduling a mix of UEs over narrower and wider frequency bands, it may be advantageous to use frequency division multiplexing access (FDMA) in order to avoid the complexities associated with time division multiplexing access (TDMA).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station, comprising:
    transmitting, on a narrowband region within a wider system bandwidth, a directional primary synchronization signal (DPSS);
    receiving feedback information from one or more user equipments (UEs) based on the DPSS, wherein the feedback information comprises an indication of a bandwidth capability of a UE that transmitted the feedback information;
    allocating resources to the one or more UEs within at least one of the wider system bandwidth or the narrowband region based, at least in part, on the feedback information; and
    performing beam training, in addition to the DPSS transmission, by transmitting beam tracking waveforms to at least one UE of the one or more UEs using different combinations of directions and bandwidth regions in a region of the wider system bandwidth that is wider than the narrowband region.

2. The method of claim 1, wherein the allocating comprises:
    allocating resource blocks (RBs) within the narrowband region to a first set of one or more UEs that provided feedback based on the DPSS; and
    allocating RBs spanning the region that is wider than the narrowband region to a second set of one or more UEs.

3. The method of claim 1, wherein:
    the DPSS is transmitted at a first time; and
    the beam tracking waveforms are transmitted at a second time.

4. The method of claim 1, wherein the beam tracking waveforms are transmitted in unicast transmissions targeting a single UE.

5. The method of claim 1, wherein performing beam training is based on a difference of channel quality between received power in a region of wider system bandwidth that is wider than the narrowband region and received power in the narrowband region within the wider system bandwidth.

6. The method of claim 1, further comprising receiving additional feedback information from the at least one UE, wherein the additional feedback information comprises one of a desired bandwidth for communication or measurements taken based on the beam tracking waveforms.

7. The method of claim 6, further comprising:
    determining a preferred bandwidth and a preferred direction for communicating with the at least one UE; and
    communicating with the at least one UE using the preferred bandwidth and preferred direction.

8. An apparatus for wireless communications by a base station, comprising:

at least one processor configured to:
   transmit, on a narrowband region within a wider system bandwidth, a directional primary synchronization signal (DPSS);
   receive feedback information from one or more user equipments (UEs) based on the DPSS, wherein the feedback information comprises an indication of a bandwidth capability of a UE that transmitted the feedback information;
   allocate resources to the one or more UEs within at least one of the wider system bandwidth or the narrowband region based, at least in part, on the feedback information; and
   performing beam training, in addition to the DPSS transmission, by transmitting beam tracking waveforms to at least one UE of the one or more UEs using different combinations of directions and bandwidth regions in a region of the wider system bandwidth that is wider than the narrowband region; and
a memory coupled with the at least one processor.

9. The apparatus of claim 8, wherein the at least one processor is configured to allocate resources to the one or more UEs by:
   allocating resource blocks (RBs) within the narrowband region to a first set of one or more UEs that provided feedback based on the DPSS; and
   allocating RBs spanning the region that is wider than the narrowband region to a second set of one or more UEs.

10. The apparatus of claim 8, wherein: the at least one processor transmits the DPSS at a first time and the beam tracking waveforms at a second time.

11. The apparatus of claim 8, wherein the at least one processor transmits the beam tracking waveforms in unicast transmissions targeting a single UE.

12. The apparatus of claim 8, wherein the at least one processor is further configured to:
   perform the beam training based on a difference of channel quality between received power in a region of wider system bandwidth that is wider than the narrowband region and received power in the narrowband region within the wider system bandwidth.

13. A method for wireless communication by a user equipment (UE), comprising:
   detecting a directional primary synchronization signal (DPSS) transmitted from a base station in a narrowband region of a wider system bandwidth;
   transmitting feedback information, generated based, at least in part, on the DPSS, to the base station, wherein the feedback information comprises an indication of a bandwidth capability of the UE;
   communicating with the base station using resources allocated within at least one of the wider system bandwidth or the narrowband region, based on the feedback information; and
   performing beam training, in addition to detecting the DPSS transmission, by detecting beam tracking waveforms, transmitted by the base station, using different combinations of directions and bandwidth regions in a region of the wider system bandwidth that is wider than the narrowband region.

14. The method of claim 13, wherein the allocated resources comprise at least one of:
   resource blocks (RBs) within the narrowband region; or
   RBs spanning the region that is wider than the narrowband region.

15. The method of claim 13, wherein:
   the DPSS is transmitted at a first time; and
   the beam tracking waveforms are transmitted at a second time.

16. The method of claim 13, wherein the beam tracking waveforms are transmitted in unicast transmissions targeting the UE.

17. The method of claim 13, wherein performing the beam training is based on a difference of channel quality between received power in a region of wider system bandwidth that is wider than the narrowband region and received power in the narrowband region within the wider system bandwidth.

18. The method of claim 13, further comprising transmitting additional feedback information to the base station, wherein the additional feedback information comprises one of a desired bandwidth for the communication or measurements taken based on the beam tracking waveforms.

19. An apparatus for wireless communication by a user equipment (UE), comprising:
   at least one processor configured to:
      detect a directional primary synchronization signal (DPSS) transmitted from a base station in a narrowband region of a wider system bandwidth;
      transmit feedback information, generated based, at least in part, on the DPSS, to the base station, wherein the feedback information comprises an indication of a bandwidth capability of the UE;
      communicate with the base station using resources allocated within at least one of the wider system bandwidth or the narrowband region, based on the feedback information; and
      perform the beam training, in addition to detecting the DPSS transmission, by detecting beam tracking waveforms, transmitted by the base station, using different combinations of directions and bandwidth regions in a region of the wider system bandwidth that is wider than the narrowband region; and
   a memory coupled with the at least one processor.

20. The apparatus of claim 19, wherein the allocated resources comprise at least one of:
   resource blocks (RBs) within the narrowband region; or
   RBs spanning the region that is wider than the narrowband region.

21. The apparatus of claim 19, wherein:
   the DPSS is transmitted at a first time; and
   the beam tracking waveforms are transmitted at a second time.

22. The apparatus of claim 19, wherein the beam tracking waveforms are transmitted in unicast transmissions targeting the UE.

23. The apparatus of claim 19, wherein the at least one processor is further configured to:
   perform the beam training based on a difference of channel quality between received power in a region of wider system bandwidth that is wider than the narrowband region and received power in the narrowband region within the wider system bandwidth.

* * * * *